United States Patent
Frost et al.

(10) Patent No.: US 10,811,051 B1
(45) Date of Patent: *Oct. 20, 2020

(54) VERBAL COMMAND VIDEO EDITING

(71) Applicant: INTERNATIONAL BUSINESS MACHINES CORPORATION, Armonk, NY (US)

(72) Inventors: Keith Gregory Frost, Delaware, OH (US); Stephen Arthur Boxwell, Franklin, OH (US); Stanley John Vernier, Grove City, OH (US); Kyle Matthew Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,757

(22) Filed: Jul. 11, 2019

Related U.S. Application Data

(63) Continuation of application No. 16/412,554, filed on May 15, 2019.

(51) Int. Cl.
*H04N 5/93* (2006.01)
*G11B 27/031* (2006.01)
(Continued)

(52) U.S. Cl.
CPC .......... *G11B 27/031* (2013.01); *G06F 40/205* (2020.01); *G06F 40/289* (2020.01);
(Continued)

(58) Field of Classification Search
CPC ............... G06F 17/241; G06F 17/2705; G06F 16/7844; G11B 27/034; H04N 21/440236
(Continued)

(56) References Cited

U.S. PATENT DOCUMENTS

| 6,031,526 A | 2/2000 | Shipp |
| 61,855,381 | 2/2001 | Schulz |

(Continued)

FOREIGN PATENT DOCUMENTS

CN   109410950 A   3/2019

OTHER PUBLICATIONS

Mell et al., "The NIST Definition of Cloud Computing", Recommendations of the National Institute of Standards and Technology, Special Publication 800-145, Sep. 2011, 7 pages.
(Continued)

*Primary Examiner* — Robert Chevalier
(74) *Attorney, Agent, or Firm* — Alexis N. Hatzis

(57) ABSTRACT

An embodiment of the invention may include a method, computer program product and computer system for video editing. The method, computer program product and computer system may include computing device which may receive video data from an imaging device, the video data may include visual and audio data. The computing device may convert the audio data to text and parse the text into textual segments. The computing device may annotate the textual segments with time stamps and analyze the annotated textual segments to identify pre-determined edit commands. The computing device may generate an edit script based on the identified pre-determined edit commands in the textual segments.

8 Claims, 6 Drawing Sheets

(51) Int. Cl.
 *G10L 15/26* (2006.01)
 *G10L 15/22* (2006.01)
 *G06F 40/205* (2020.01)
 *G06F 40/289* (2020.01)

(52) U.S. Cl.
 CPC ............ *G10L 15/22* (2013.01); *G10L 15/265* (2013.01); *G10L 2015/223* (2013.01)

(58) Field of Classification Search
 USPC ................................. 386/281, 278, 282, 285
 See application file for complete search history.

(56) References Cited

U.S. PATENT DOCUMENTS

| | | | |
|---|---|---|---|
| 9,870,060 | B2 | 1/2018 | Marggraff et al. |
| 9,870,798 | B2 | 1/2018 | Pribula |
| 10,033,915 | B2 | 7/2018 | Boghosian et al. |
| 2006/0023117 | A1* | 2/2006 | Feldmeier .......... H04N 7/17318 348/441 |
| 2008/0183844 | A1 | 7/2008 | Gavin |
| 2013/0343727 | A1 | 12/2013 | Boiman |
| 2017/0228600 | A1 | 8/2017 | Syed |
| 2017/0249425 | A1* | 8/2017 | Narayanaswamy .. G06F 21/602 |
| 2018/0270446 | A1 | 9/2018 | Weil et al. |

OTHER PUBLICATIONS

IBM: List of IBM Patents or Patent Applications Treated as Related (Appendix P), Jan. 20, 2020, pp. 1-2.
U.S. Appl. No. 16/412,554, entitled "Verbal Command Video Editing ", Filed May 15, 2019, 38 Pages.

* cited by examiner

VERBAL COMMAND VIDEO EDITING

BACKGROUND

The present invention relates generally to a method, system, and computer program for video editing. More particularly, the present invention relates to a method, system, and computer program for automatic verbal command-based video annotating and editing.

Video editing is the post-production process of editing segments of video footage, special effects, and sound recordings. Video editing used to be relegated to expensive machines, but today video editing software is widely available for use on personal computers and workstations. The need for video editing software has grown exponentially over the last decade as more and more social media video platforms have become widely available. The exponential growth and availability in social media video platforms have resulted in a corresponding growth in content creators who are generating video content, editing that video content and uploading the video content to the social media video platforms and elsewhere.

BRIEF SUMMARY

An embodiment of the invention may include a method, computer program product and computer system for video editing. The method, computer program product and computer system may include computing device which may receive video data from an imaging device, the video data may include visual and audio data. The computing device may convert the audio data to text and parse the text into textual segments. The computing device may annotate the textual segments with time stamps and analyze the annotated textual segments to identify pre-determined edit commands. The computing device may generate an edit script based on the identified pre-determined edit commands in the textual segments. The computing device may analyze the edited video file to identify dead time created by the editing of the video data and edit the identified dead time out of the edited video file. The computing device may generate an edited video file by editing the video file based on the generated edit script.

BRIEF DESCRIPTION OF THE DRAWINGS

FIG. 1b illustrates example operating modules of the video editing program of FIG. 1a.

DETAILED DESCRIPTION

Figure 1A:
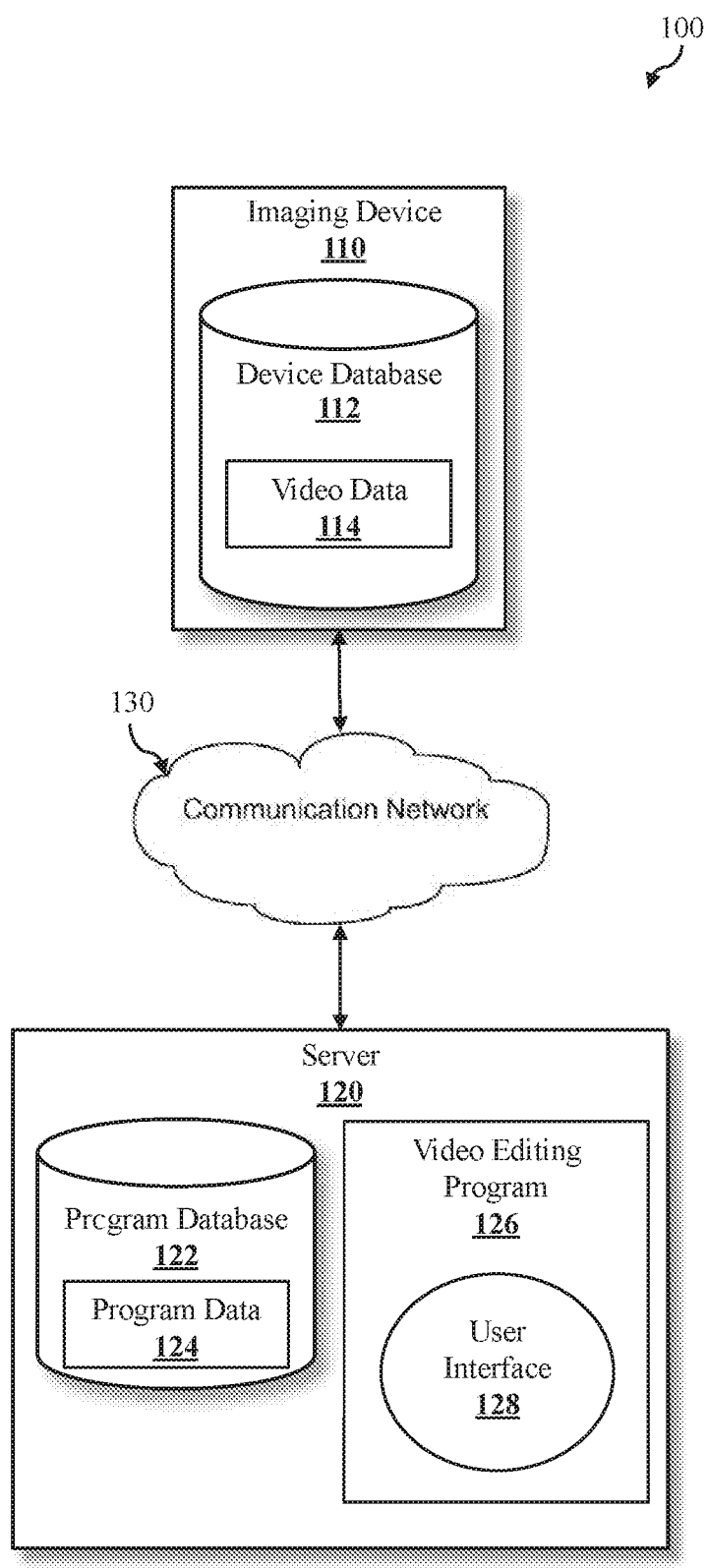
FIG. 1a illustrates a system for video editing, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for video editing. More particularly, the present invention relates to a method, system, and computer program for automatic verbal command-based video annotating and editing Current technology does not allow for automatic editing of video data based on verbal commands contained within the video data. Currently, there are existing systems for the verbal control of the actual filming process of video content. However, there are no such verbal control/command systems for the post-production video editing. Video editing is often the most time-consuming process of generating video content. Accordingly, a need exists for an easy video editing system and methodology. Embodiments of the present invention provide a system and methodology which allows content creators to provide verbal commands during the filming of a video which are then identified by the inventive system to automatically edit the video upon filming completion. Thus, embodiments of the current invention reduce the time spent by content creators on the video editing process.

Reference will now be made in detail to the embodiments of the present invention, examples of which are illustrated in the accompanying drawings, wherein like reference numerals refer to like elements throughout. Embodiments of the invention are generally directed to a system for automatic verbal command-based video annotating and editing.

FIG. 1 illustrates a video editing system 100, in accordance with an embodiment of the invention. In an example embodiment, video editing system 100 includes an imaging device 110, and a server 120, interconnected via network 130.

In the example embodiment, the network 130 is the Internet, representing a worldwide collection of networks and gateways to support communications between devices connected to the Internet. The network 130 may include, for example, wired, wireless or fiber optic connections. In other embodiments, the network 130 may be implemented as an intranet, a local area network (LAN), or a wide area network (WAN). In general, the network 130 can be any combination of connections and protocols that will support communications between the imaging device 110, and server 120.

The imaging device 110 may include the device database 112. The imaging device 110 may be any device capable of capturing the video data 114. For example, the imaging device 110 may be a camera, a computer, a tablet, a thin client, a cellphone, or any other device capable of capturing, storing, and/or compiling the video data 114. Further, the imaging device 110 may send the video data 114 to and from other computing devices, such as the server 120 via the network 130. The video data 114 may include, but is not limited to, visual, and/or audio data. For example, the imaging device 110 may be a video camera used to shoot a movie and capture the visual and audio data of the movie. Thus, the video data 114 may include natural language audio data. While only a single imaging device 110 is illustrated, it can be appreciated that any number of imaging devices may be a part of the video editing system 100. For example, a movie or television show may be shot using multiple video cameras. In embodiments of the invention, the imaging device 110 and the server 120 may be the same device. For example, the imaging device 110, e.g. a camera, may have the server 120 incorporated into the imaging device 110 or the imaging device 110 may be resident in the server 120. The imaging device 110 is described in more detail above and with reference to FIG. 3.

The device database 112 may store the video data 114, i.e. the visual, and/or audio data, captured by the imaging device 110. The image database 112 may be any storage media capable of storing data, such as, but not limited to, storage media resident in the imaging device 110 and/or removeable storage media. For example, the image database 112 may be, but is not limited to, a hard drive, a solid stated drive, a USB drive, or a memory card, etc. The image database 112 is described in more detail above and with reference to FIG. 3.

The server 120 may include the program database 122 and the video editing program 126. In an example embodiment, the server 120 may be a desktop computer, a notebook, a laptop computer, a tablet computer, a thin client, or any other electronic device or computing system capable of storing compiling and organizing audio, visual, or textual content, e.g. the video data 114, and receiving and sending that content to and from other computing devices, such as the imaging device 110. While only a single server 120 is depicted, it can be appreciated that any number of servers may be part of the video editing system 100. In some embodiments, the server 120 includes a collection of devices, or data sources, in order to collect the program data 124. The server 120 is described in more detail with reference to FIG. 3.

The program database 122 may store the program data 124. The program database 122 may be any storage media capable of storing data capable of storing data, such as, but not limited to, storage media resident in the server 120 and/or removeable storage media. For example, the program database 122 may be, but is not limited to, a hard drive, a solid stated drive, a USB drive, or a memory card, etc. The program database 122 is described in more detail with reference to FIG. 3.

The program data 124 may be a collection of audiovisual data including, but not limited to, audio, visual, and textual data. The program data 124 may include, for example, the video data 114 received and/or collected from the imaging device 110. The program data 124 may also include a list of pre-determined edit commands. The pre-determined edit commands designate actions to be taken by the video editing program 126, which is described in more detail below with reference to FIG. 1b. Further, the program data 124 may include user data associated with users of the video editing system 100 such as, but not limited to, a user's identification, a user's program preferences, and a list of the imaging devices 110 associated with a user, etc. The program data 124 is located on the server 120 and can be accessed via the network 130. In accordance with an embodiment of the invention, the program data 124 may be located on one or a plurality of servers 120.

The video editing program 126 may include the user interface 128. The video editing program 126 is a program capable of receiving the video data 114, analyzing the video data 114 for verbal video edit commands contained within the audio data of the video data 114, and editing the video data 114 in accordance with any identified verbal video edit commands. The video editing program 126 may receive the video data 114 directly from the imaging device 110. In another embodiment, the video editing program 126 may receive the video data 114 from the server 120, the video data 114 being received and/or collected by the server 120 and stored as the program data 124 in the program database 122. The video editing program 126 is described in more detail below with reference to FIG. 1b.

The user interface 128 includes components used to receive input from a user on the server 120 and transmit the input to the video editing program 126 residing on server 120, or conversely to receive information from the video editing program 126 and display the information to the user on the server 120. In an example embodiment, the user interface 128 uses a combination of technologies and devices, such as device drivers, to provide a platform to enable users of the server 120 to interact with the video editing program 126. In the example embodiment, the user interface 128 receives input, such as but not limited to, textual, visual, or audio input received from a physical input device, such as but not limited to, a keypad and/or a microphone.

Figure 1B:
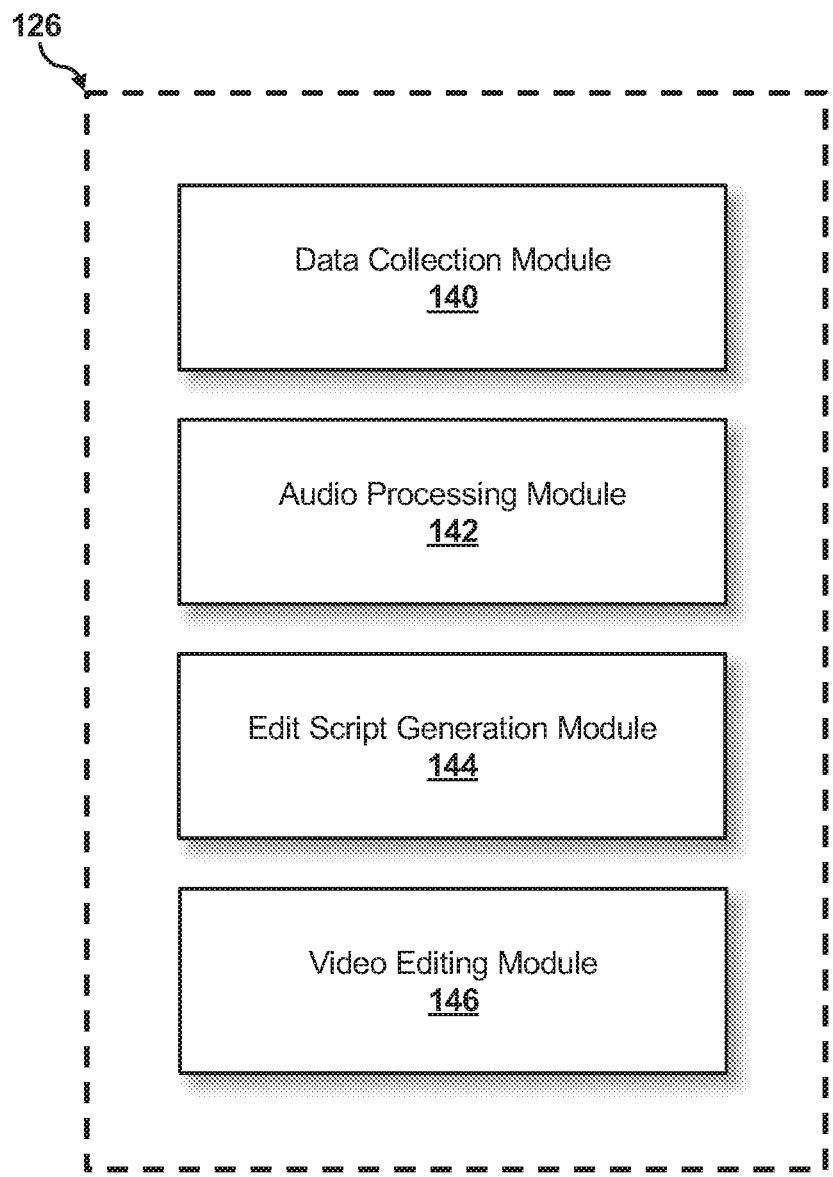

FIG. 1b illustrates example modules of the video editing program 126. In an example embodiment, the video editing program 136 may include four modules: data collection module 140, audio processing module 142, edit script generation module 144, and video editing module 146.

The data collection module 140 receives the video data 114 from the imaging device 110. In an example embodiment, the data collection module 140 may receive the video data 114 directly from the imaging device 110. Alternatively, the data collection module 140 may receive the video data 114 stored as program data 124 from the program database 122.

The audio processing module 142 converts the audio portion of the video data 114 to text. The audio processing module 142 may use any speech-to-text service to convert the audio portion of the video data 114 to text. The audio processing module 142 parses the converted text into textual segments and annotates the textual segments with time stamps. The time stamps correlate to the times in the video data 114 when the textual segments, e.g. the audio portion of the video data 114, occur. For example, the video data 114 may be a video which will be uploaded to a media channel and the audio portion of the video data 114 may be converted and annotated as follows:

| Time Stamp | Text Segment |
| --- | --- |
| 00:00 - | EditTron9000 start on camera one. |
| 00:05 - | Hi, my name is SpicyEddie99 and today we're going to eat 20 atomic wings. |
| 00:15 - | EditTron9000 wipe transition to my intro. |

-continued

| Time Stamp | Text Segment |
| --- | --- |
| 00:20 - | What's up everyone? |
| 00:22 - | Let's take a look at what we're eating today. |
| 00:27 - | EditTron9000 transition to camera two. |
| 00:32 - | ATOMIC WINGS!! |
| 00:34 - | Let's get to stuffing our faces. |
| 00:39 - | EditTron9000 transition to camera one. |
| 00:43 - | Oh no I dropped the wings. |
| 01:31 - | Ugh, this is gross. |
| 02:45 - | Disgusting |
| 04:32 - | EditTron9000 remove everything since the previous edit. |
| 04:42 - | EditTron9000 start timelapse and add yakkity sax. |
| 14:31 - | EditTron9000 stop timelapse and music. |
| 14:36 - | Thanks for joining me everyone. |
| 14:42 - | See you next time. |
| 14:45 - | EditTron9000 fade out and play my outro. |

The edit script generation module 144 analyzes the annotated textual segments to identify pre-determined edit commands. The pre-determined edit commands may be, for example, but not limited to, word(s) and/or phrase(s) spoken by a user to denote an edit to be made to the video data 114. In the above annotated textual segments, the pre-determined edit command is "EditTron9000." Thus, the edit script generation module 144 would identify all textual segments that begin with "EditTron9000." In another embodiment, the pre-determined edit commands may be phrases such as "Start Rolling Camera 1," "Play Intro," "Transition to Camera 2," "Remove Video Since Previous Edit," "Fade out," "Play Outro," and "Cut." The edit script generation module 144 generates an edit script based on the identified textual segments with the pre-determined edit commands. In one embodiment, the edit script generation module 144 may identify the pre-determined edit commands and generate the edit script using a Levenshtein-distance metric. The Levenshtein-distance metric converts the textual segments into intents and compares the utterances to reference intents, i.e. pre-determined edit commands, to determine which intent it most closely resembles. In another embodiment, the edit script generation module 144 may identify the pre-determined edit commands and generate the edit script by converting the textual segments into intents by defining intents, i.e. pre-determined edit commands, as regular expressions, which may include numerical values and specific function targets. For example, the pre-determined edit commands, i.e. intents, may be a word such as, but not limited to, "EditTron9000" coupled with regular expressions such as, but not limited to "start a time lapse for x-time and then add outro music file." Thus, the regular expressions may contain commands for the video editing program 126 to do specified action for a specified time period or to add/delete something during a specified time period, etc. In another embodiment, the edit script generation module 144 may identify the pre-determined edit commands and generate the edit script by using a comprehensive value-sensitive intent-based application programming interface (API) such as, but not limited to, IBM® Watson Assistant. Continuing with the example textual segments above, the edit script generation module 144 may generate an edit script as follows:

remove 00:00, 00:04
    wipeTransition 00:15, intro
    remove 00:15, 00:19
    setActiveCamera 00:27, 2
    setActiveCamera 00:39, 1
    remove 00:39, 04:32
    remove 04:32, 04:42
    timeLapse 04:42, 14:31
    addMusic 04:42, 14:31, "yakkitysax.mp3"
    remove 04:42, 04:45
    remove 14:31, 14:36
    fadeOut 14:45
    addMusic 14:45 "outro.mp3".

The video editing module 146 edits the video data 114 based on the generated edit script and generates an edited video file. For example, but not limited to, the video editing module 146 may remove portions of the video data 114, add specified data to the video data 114, and splice multiple camera feeds together, etc. Further, the video editing module 146 may analyze the edited video file to identify "dead time", i.e. periods of no audio after the pre-determined edit commands, created by the editing of the video data, and edit out the identified dead time.

Figure 2:
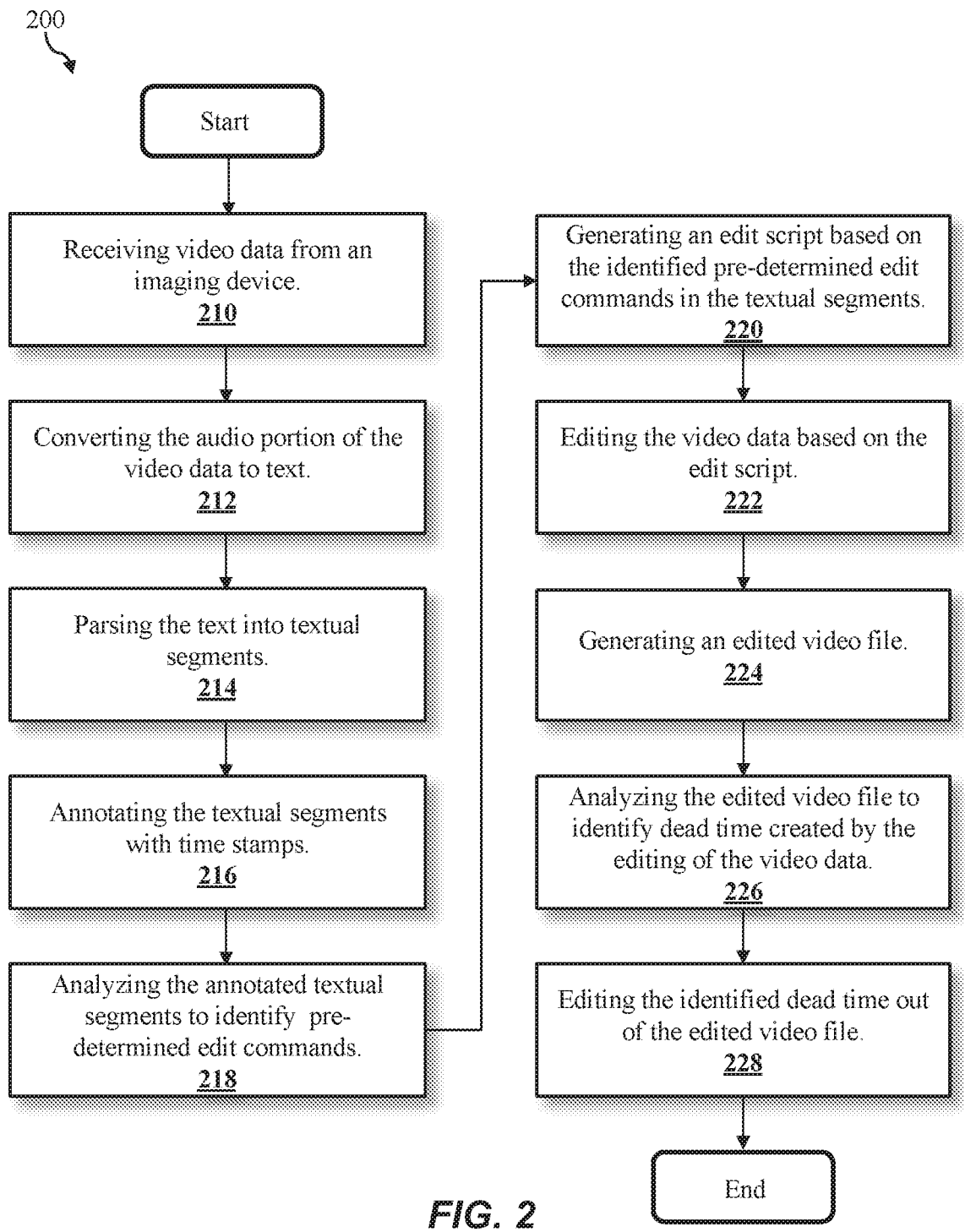
FIG. 2 is a flowchart illustrating an example method of video editing in accordance with an embodiment of the invention.

Referring to FIG. 2, a method 200 for video editing is depicted, in accordance with an embodiment of the present invention.

Referring to block 210, the data collection module 140 receives the video data 114 from the imaging device 110. Data collection is described in more detail above with reference to the data collection module 140.

Referring to block 212, the audio processing module 142 converts the audio portion of the video data 114 to text. Audio-to-text conversion is described in more detail above with reference to the audio processing module 142.

Referring to block 214, the audio processing module 142 parses the converted text into textual segments. Text parsing is described in more detail above with reference to the audio processing module 142.

Referring to block 216, the audio processing module 142 annotates the textual segments with time stamps. Textual segment annotation is described in more detail above with reference to the audio processing module 142.

Referring to block 218, the edit script generation module 144 analyzes the annotated textual segments to identify pre-determined edit commands. Pre-determined edit command identification is described in more detail above with reference to the edit script generation module 144.

Referring to block 220, the edit script generation module 144 generates an edit script based on the identified textual segments with the pre-determined edit commands. Edit script generation is described in more detail above with reference to the edit script generation module 144.

Referring to block 222, the video editing module 146 edits the video data 114 based on the generated edit script. Video editing is described in more detail above with reference to the video editing module 146.

Referring to block 224, the video editing module 146 generates an edited video file. Edited video file generation is described in more detail above with reference to the video editing module 146.

Referring to block 226, the video editing module 146 analyzes the edited video file to identify dead time created by the editing of the video data. Dead time analysis is described in more detail above with reference to the video editing module 146.

Referring to block 228, the video editing module 146 edits out the identified dead time. Dead time editing is described in more detail above with reference to the video editing module 146.

Figure 3:
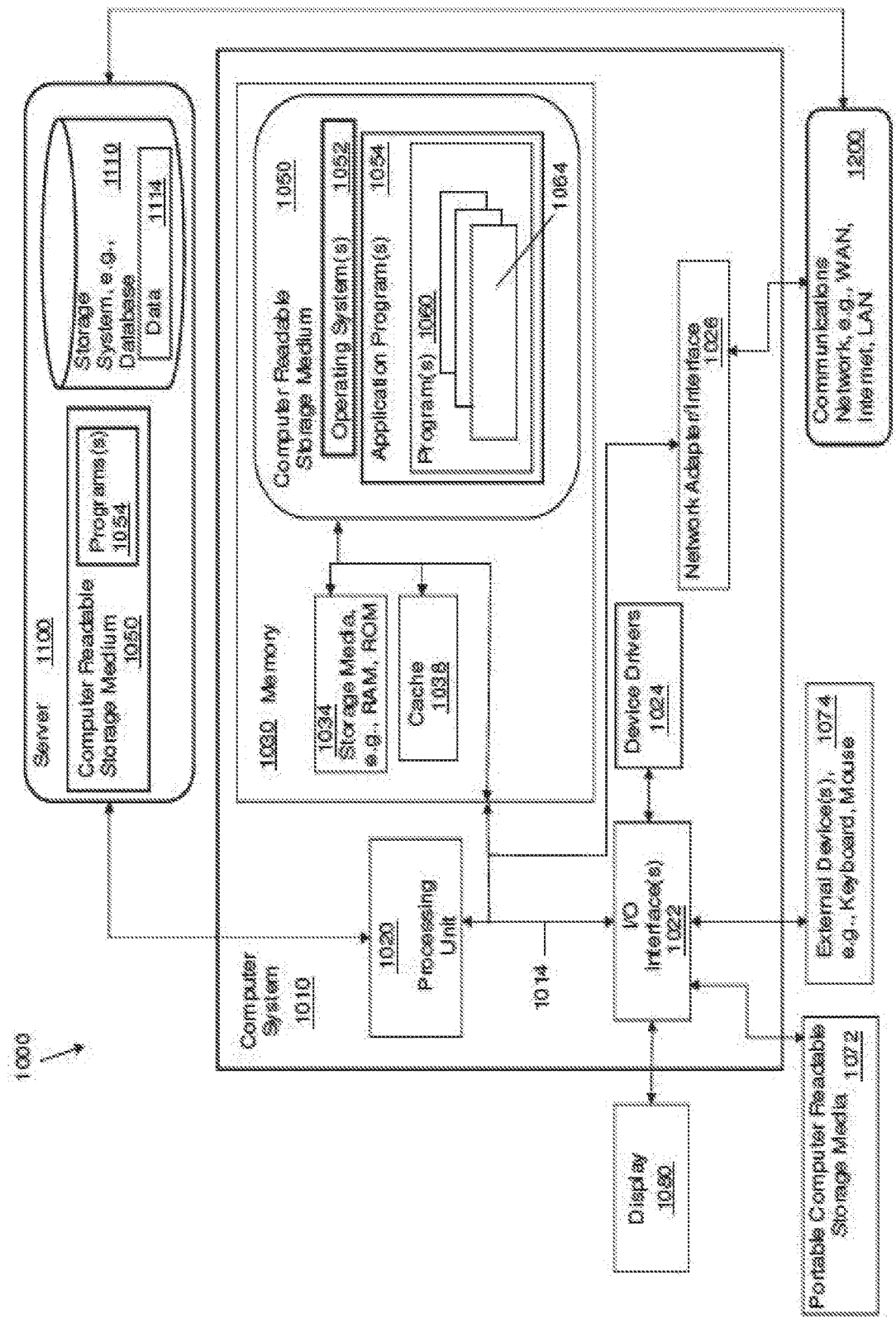
FIG. 3 is a block diagram depicting the hardware components of the video editing system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 4 becomes specifically configured to implement mechanisms of the illustrative embodiments and specifically configured to perform the operations and generated the outputs of described herein for determining a route based on a user's preferred environmental experiences.

The method 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 140-146 described above with reference to FIG. 1*b*. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
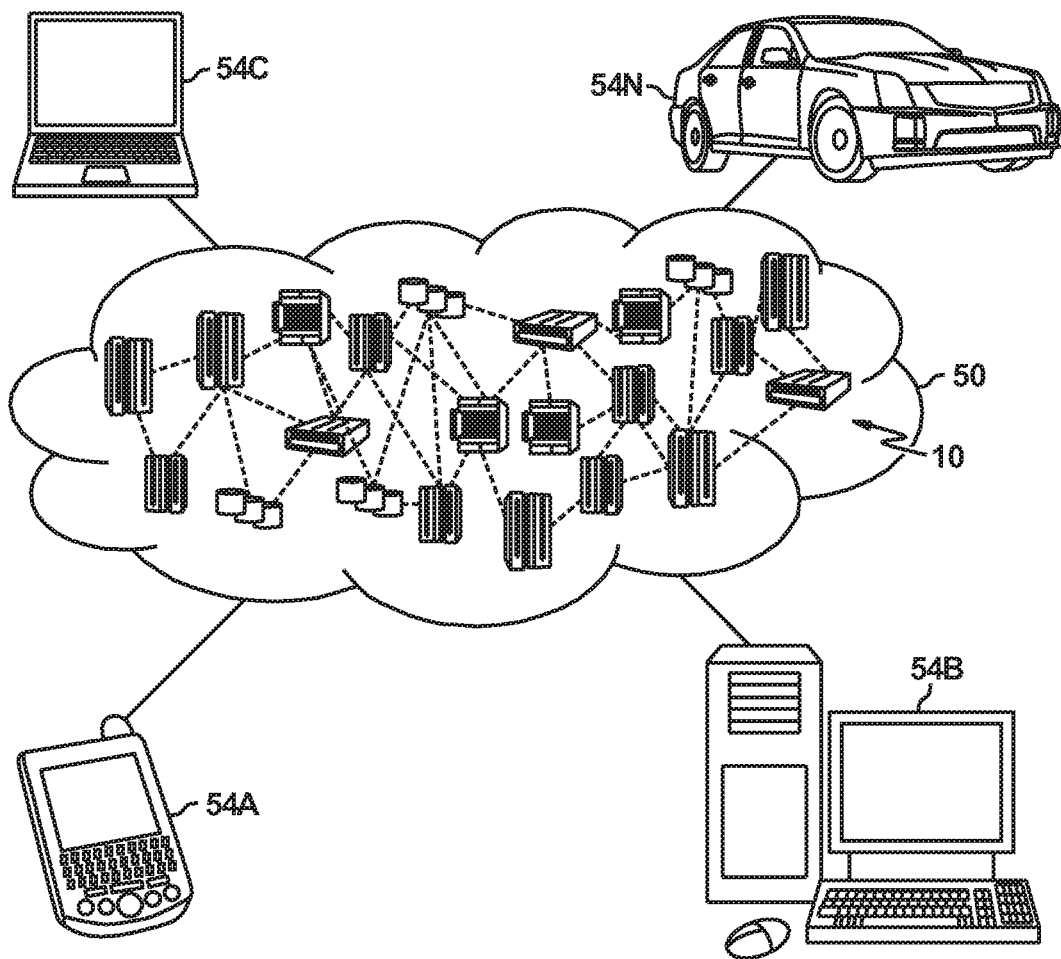
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
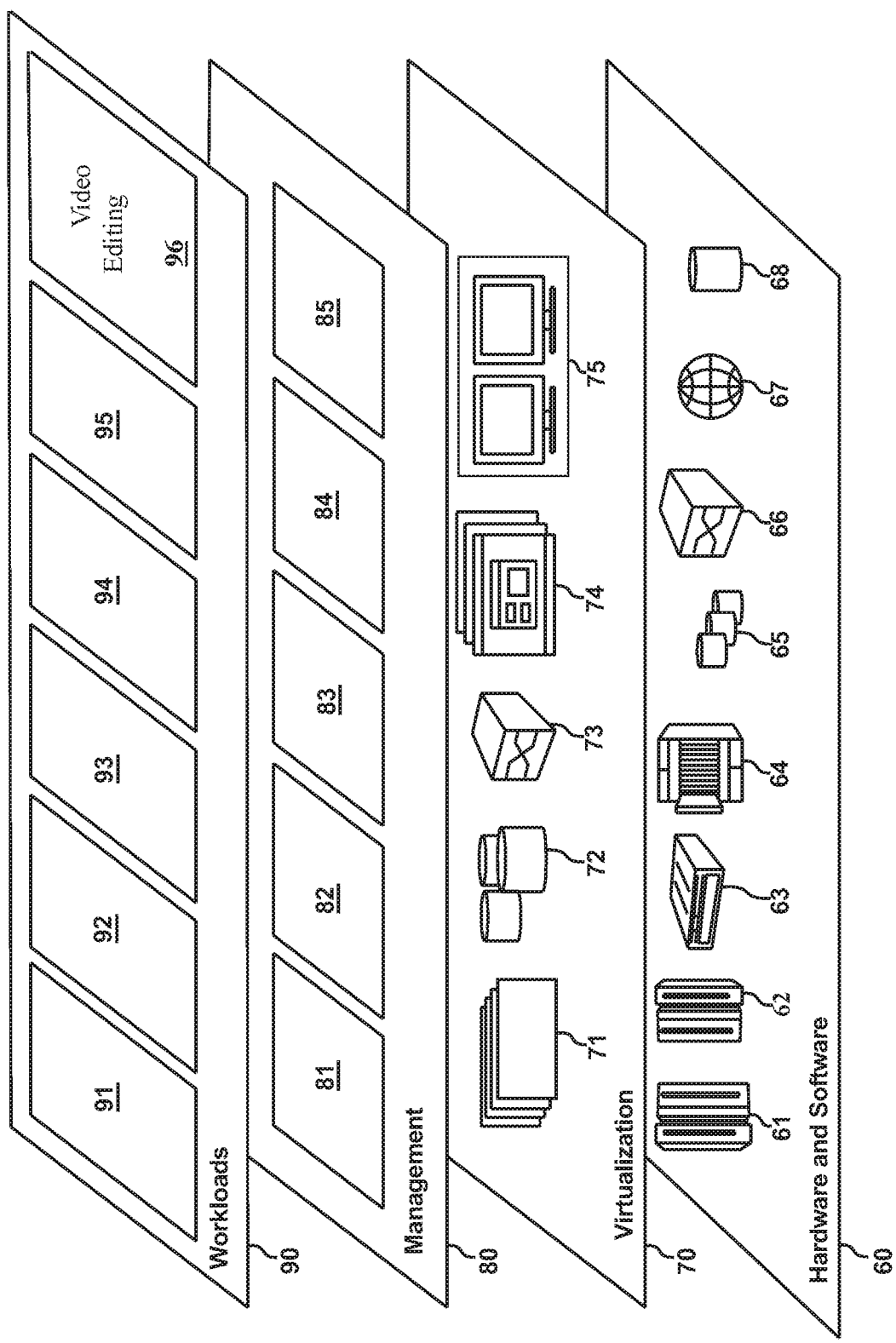
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video editing 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for video editing, the method comprising:
   receiving, by a computing device, video data from an imaging device, wherein the video data includes visual and audio data;
   converting, by the computing device, the audio data to text;
   parsing, by the computing device, the text into textual segments;
   annotating, by the computing device, the textual segments with time stamps;
   analyzing, by the computing device, the annotated textual segments to identify pre-determined edit commands; and
   generating, by the computing device, an edit script based on the identified pre-determined edit commands in the textual segments.

2. The method of claim 1, further comprising:
   analyzing, by the computing device, the edited video file to identify dead time created by the editing of the video data; and
   editing, by the computing device, the identified dead time out of the edited video file.

3. The method of claim 1, further comprising:
   generating, by the computing device, an edited video file by editing the video file based on the generated edit script.

4. The method of claim 1, wherein the audio data includes natural language editing commands spoken by a user at a time of creation of the video data.

5. The method of claim 1, wherein the pre-determined edit commands are designated by a pre-determined phrase.

6. The method of claim 1, wherein the pre-determined edit commands include a time parameter.

7. The method of claim 1, wherein the pre-determined edit commands are identified using a Levenshtein distance metric.

8. The method of claim 1, wherein the pre-determined edit commands are identified using a comprehensive value-sensitive, intent-based application programming interface (API).

* * * * *